United States Patent [19]

Lauzon

[11] Patent Number: 5,764,831
[45] Date of Patent: Jun. 9, 1998

[54] GRATING ASSISTED FUSED FIBER FILTER

[75] Inventor: Jocelyn Lauzon, St-Augustin-de-Desmaures, Canada

[73] Assignee: Institut National D'Optique, Sainte-Foy, Canada

[21] Appl. No.: 839,582

[22] Filed: Apr. 15, 1997

[51] Int. Cl.$^6$ .................................................. G02B 6/26
[52] U.S. Cl. ......................... 385/43; 385/96; 385/39
[58] Field of Search ........................... 385/39–43, 95, 385/96, 147

[56] References Cited

U.S. PATENT DOCUMENTS

| | | | |
|---|---|---|---|
| 4,699,452 | 10/1987 | Mollenauer et al. | 385/39 |
| 4,881,790 | 11/1989 | Mollenauer et al. | 385/15 |
| 5,457,758 | 10/1995 | Snitzer | 385/30 |
| 5,459,801 | 10/1995 | Snitzer | 385/30 |
| 5,636,300 | 6/1997 | Keck et al. | 385/24 |

FOREIGN PATENT DOCUMENTS

| | | |
|---|---|---|
| 4335428 | 5/1995 | Germany. |
| WO 9522783 | 8/1995 | WIPO. |

OTHER PUBLICATIONS

Grating-frustrated coupler: a novel channel–dropping filter in single–mode optical fiber, Archambault, Russell, Barcelos, Hua and Reekie, Optical Letters, 1994, vol. 19, No. 3, pp. 180–182. no month.

Compact All–Fiber Add–Drop–Multiplexer Using Fiber Bragg Gratings, Baumann, Seifert, Nowak and Sauer, IEEE Photonics Technology Letters, 1996, vol. 8, No. 10, pp. 1331–1333. no month.

Flat–Field Spectrograph in SiO$_2$/Si, Clemens, März, Reichelt and Schneider, IEEE Photonics Technology Letters, 1992, vol. 4, No. 8, pp. 886–887. no month.

High–Return–Loss Narrowband All–Fiber Bandpass Bragg Transmission Filter, Bilodeau, Hill, Malo, Johnson and Albert, IEEE Photonics Technology Letters 1994, vol. 6, No. 1, pp. 80–82. no month.

Integrated Optics N×N Multiplexer on Silicon, Dragone, Edwards and Kistler, IEEE Photonics Technology Letters, 1991, vol. 3, No. 10, pp. 896–898. no month.

Four–port Fiber Frequencey Shifter with a Null Taper Coupler, Birks, Farwell, Russell, and Pannell, Optics Letters, 1994, vol. 19, No. 23, pp. 1964–1966. no month.

Novel Add/Drop Filters for Wavelength–Division–Multiplexing Optical Fiber Systems Using a Bragg Grating Assisted Mismatched Coupler, Dong, Hua, Birks, Reekie and Russell, IEEE Photonics Technology Letters, 1996, vol. 8, No. 12, pp. 1656–1658. no month.

Analyse d'un coupleur bidirectional à fibres optiques monomodes fusionnées, Bures, Lacroix et Lapierre, Applied Optics, 1983, vol. 22, No. 12, pp. 1918–1922. no month.

Primary Examiner—Akm E. Ullah
Attorney, Agent, or Firm—Merchant, Gould, Smith, Edell, Welter, & Schmidt, P.A.

[57] ABSTRACT

A fused fiber filter coupler is disclosed characterized in that a long period grating is written in at least a portion of the waist of the coupler. The two fibers which make up the coupler have respective propagation constants $\beta_{fiber1}$ and $\beta_{fiber2}$ which are different and both fibers are singlemode at the wavelength of operation. In order for an efficient grating to be written in the waist of the coupler, the couple must be photosensitive in at least a region of the waist. Since the propagation constant is a function of the wavelength and the period of the grating is given by the expression $\Lambda = 2\pi/(\beta_{fiber1} - \beta_{fiber2})$, the filter may be tuned to a particular wavelength by adjusting the period of the grating. The filter so constructed acts in transmission and can discriminate wavelengths of the order of 1 nm. The filter is particularly useful in wavelength-rich optical communications networks to extract a particular wavelength from a signal or to add a particular wavelength to a signal (i.e. multiplexing and demultiplexing).

3 Claims, 3 Drawing Sheets

GRATING ASSISTED FUSED FIBER FILTER

FIELD OF THE INVENTION

The invention relates to all-fiber optical wavelength filters, and more specifically to a grating assisted fused fiber filter.

DESCRIPTION OF THE PRIOR ART

Wavelength multiplexers and demultiplexers (MUX/DEMUX) are essential to Wavelength Division Multiplexing (WDM) communication systems. With the advent of optical communications, optical WDM is an essential component of future communications systems. The communication capacity of these systems will be greatly increased by multiplying the number of optical wavelength carriers (channels) in a communication link. As such, wavelength MUX/DEMUX will be used at the periphery of such WDM systems in order to gather and dispatch the information associated with the different wavelength carriers. These MUX/DEMUX should be able to separate dense, WDM channels with wavelength discrimination of the order of 1 nm.

The presently exists some efficient integrated optics MUX/DEMUX, but for practical and economical reasons, an all-fiber device would be preferable. Fiber Bragg Gratings are such components, but they operate in reflection, rather than transmission, and either a circulator, a balanced interferometer, a channel dropping polished fiber coupler of a balanced fiber coupler is required to access part of the information.

In "Grating-frustrated coupler: a novel channel-dropping filter in single mode optical fiber", Archambault, Russell, Barcelos, Hua and Reekie, Optical Letters, 1994, Vol. 19, No. 3, pp. 180–182, there is disclosed a polished fiber coupler for filtering out a particular wavelength. A Bragg grating is written in one arm of the fiber coupler which includes two optical fibers having identical cores. The Bragg grating acts as a perturbation rather than a phase matching (coupling) element. Thus, frequency response of this device is not smooth and would possibly not allow complete energy transfer at the selected wavelength.

U.S. Pat. No. 5,459,801 to Snitzer discloses an "add-drop multiplexer". Here also a grating is photowritten in one arm of a fiber coupler, exactly in the longitudinal center of the coupler waist, to create a coupling by reflection. However, the two fiber arms of the coupler are identical and the grating does not act as a coupling perturbation but as a frequency selective reflective element. The coupler waist length is adjusted for complete coupling by evanescent light in transmission for a certain wavelength region, which requires very fine alignment of the grating within the coupler's waist. Similar devices are also disclosed in U.S. Pat. No. 5,457,758 to Snitzer, "Compact All-Fiber Add-Drop-Multiplexer Using Fiber Bragg Gratings", Bauman, Seifert, Nowvak and Sauer, IEEE Photonics Technology Letters, 1996, Vol. 8, No. 10, pp. 1331–333, German Patent Application No. DE 43 35 428 (which substantially discloses the matter disclosed in the previous article by common authors).

Another similar technology is described in "Four-port Fiber Frequency Shifter with a Null Taper Coupler" by Birks, Farwell, Russell and Pannell, Optics Letters, 1994, Vol. 19, No. 23, pp. 1964–1966 and International Application No. WO 9522783. In these documents, the two fiber arms have different propagation constants. However, the coupling element is an acoustic wave guided by the coupler's waist. This component couples light from one fiber to another and at the same time shifts the frequency of the coupled light. The frequency response of this component is not smooth; furthermore, this device is an active device.

In "Novel Add/Drop Filters for Wavelength-Division Multiplexing Optical Fiber Systems Using a Bragg Grating Assisted Mismatched Coupler", Dong, Hua, Birks, Reekie and Russell, IEEE Photonics Technology Letters, 1996, Vol. 8, No. 12, pp. 1656–1658, there is described a coupler made of two fibers having different propagation constants. However, the coupler described therein is made of a side-polished coupler, although the authors suggest that such a device could be embodied with a fused fiber coupler, without providing any other information. This device acts as a reflection filter and since the fibers are only photosensitive in the core, this implies that much higher index changes are necessary to obtain efficient coupling.

A mathematical modelling of a fused fiber filter is proposed in "Analyse d'un coupleur Bidirectionnel à fibres optiques monomodes fusionnées", Bures, Lacroix, Lapierre, Applied Optics, 1983, Vol. 22, No. 12, pp. 1918–1922.

There is thus a need for a passive, all-fiber device which acts in transmission, not in reflection, which can discriminate in a narrow range of wavelengths, and which does not shift the frequency of the desired wavelength component.

SUMMARY OF THE INVENTION

It is an object of the invention to provide a fused fiber filter acting in transmission, which can discriminate a narrow range of wavelengths and which does not shift the frequency of the desired wavelength component.

In accordance with the invention, this object is achieved with a fused fiber filter for coupling two optical fibers at a given operation wavelength. The fused fiber filter has two opposite ends, a waist length L, a waist diameter $\phi$, a taper region near each of the opposite ends, a first optical fiber and a second optical fiber. The first optical fiber has a first propagation constant $\beta_{fiber1}$ and a first core diameter and the second optical fiber has a second propagation constant $\beta_{fiber2}$ and a second core diameter. The first and second optical fibers are generally parallel along the waist length of the fused fiber filter.

The fused fiber filter is characterized in that $\beta_{fiber1}$ is differ from $\beta_{fiber2}$, each of the optical fibers are singlemode at the operation wavelength; at least one of the fibers is photosensitive in the region of the waist; the core diameter of the second optical fiber is larger than the core diameter of the first optical fiber and at least a portion of the waist is provided with a long period grating, where the period of the grating corresponds to $\Lambda = 2\pi/(\beta_{fiber1} - \beta_{fiber2})$ such that the operation wavelength is coupled from one of the first and second optical fibers to the other of the first and second optical fiber.

BRIEF DESCRIPTION OF THE DRAWINGS

The present invention and its advantages will be more easily understood after reading the following non-restrictive description of preferred embodiments thereof, made with reference to the following drawings, in which.

DESCRIPTION OF A PREFERRED EMBODIMENT OF THE INVENTION

Figure 1:
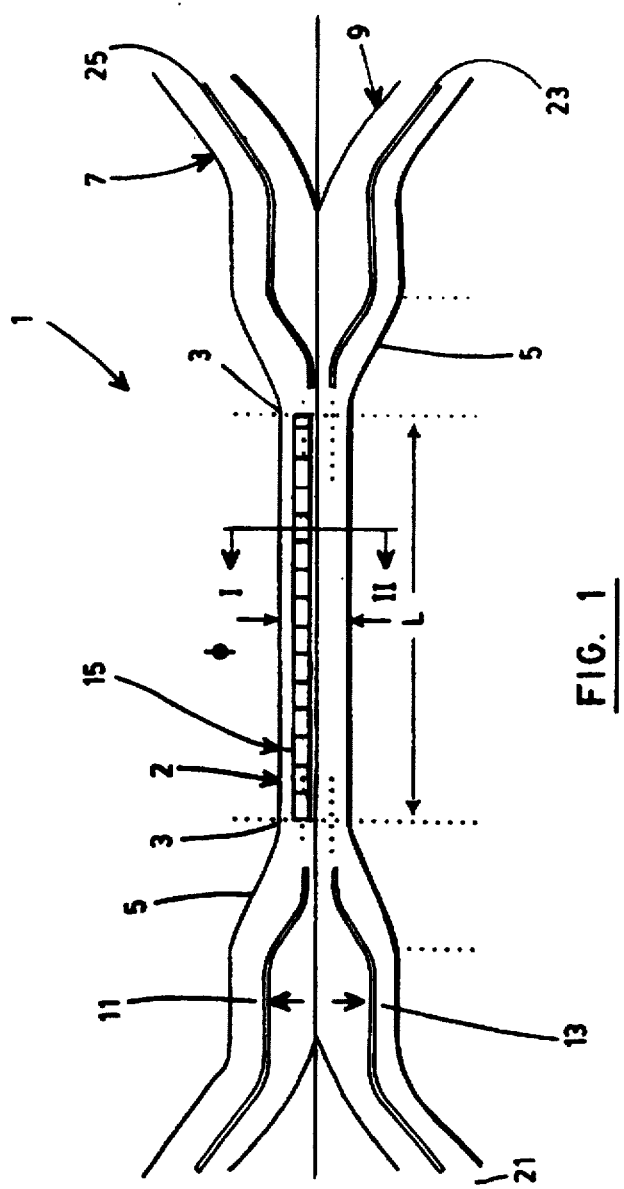
FIG. 1 is a schematic representation of the fused fiber filter according to the invention.

FIG. 1 shows a grating assisted fused fiber filter 1 has two opposite ends, 3 a waist embodiment of the invention. The fused fiber filter 1 has two opposite ends 3, a waist 2, a waist length L, a waist diameter $\phi$, a taper region 5 near each of the opposite ends and a first optical fiber 7 and a second optical fiber 9. Preferably, the taper regions 5 are made to obtain a smooth transition in order to reduce losses as much as possible.

The first optical fiber 7 has a first propagation constant $\beta_{fiber1}$ and a first core diameter 11. The second optical fiber 9 has a second propagation constant $\beta_{fiber2}$ and a second core diameter 13. It is important that the propagation constants be different, so that normally there would be practically no coupling of lights between the two fibers 7, 9 without external help.

The propagation constant $\beta$ is given by the following expression:

$$\beta = 2\pi n_{eff}/\lambda$$

where $n_{eff}$ is the effective index of the fiber and $\lambda$ is the wavelength of operation. The effective index of a fiber $n_{eff}$ can be easily determined when all the characteristics of the fiber are known.

Another important aspect of the invention is that the two fibers 7, 9 be singlemode at the wavelength of operation $\lambda$ of the device.

It is known that frequency selective coupling can be achieved with such a null taper coupler by acoustic compensation of the dispersion between the fibers, as mentioned in the Description of Prior Art.

The invention resides in the use of a long period grating 15 written in at least a portion of the waist 2 of the fused fiber filter 1 to obtain the same result. As such, the cladding of the fibers 7,9 has to be photosensitive in at least a portion of the waist 2 to permit an efficient grating 15 to be written in this region, since the waist 2 of the fused fiber filter has a small diameter $\phi$, i.e. smaller 10 µm.

In order to create a wavelength selective coupling, the grating period $\Lambda$ should correspond to:

$$\Lambda = 2\pi/(\beta_{fiber1} - \beta_{fiber2})$$

so that by selecting the operation wavelength $\lambda$, the period $\Lambda$ of the long period grating 15 can be determined.

Such a filter, made of a small core fiber having a diameter of 4 µm and a numerical aperture of NA=0.13 and a larger core fiber having a diameter of 5.8 µm and a numerical aperture NA=0.2 was evaluated numerically with a Beam Propagation Method (BPM) combined with a Transfer Matrix Method (TMM). Both fibers have a cladding diameter of 125 µm and ann index $n_{clad}=1.444$.

This design is easily feasible and allows low-loss fusion splicing (less than 0.2 dB) to standard communication fibers. It should be understood that any other design may also work as long as it falls within the above design parameters, possibly even better than the suggested configuration which is far from being optimal.

The selected wavelength of operation for the analysis is 1550 nm, such that both fibers are singlemode at 1550 nm. Is should be understood that any wavelength of operation can be selected as long as the fiber and grating design is adapted accordingly.

Both taper regions 5 were assumed to be 20 mm long, which is easily feasible.

A wavelength-rich signal, comprising a plurality of different wavelengths, is inputted at 21 of the second optical fiber 9. The grating couples the signal within a bandwidth centered around wavelength $\lambda$ from the second fiber 9 to the first fiber 7, which coupled signal exits at 25 of the first optical fiber. The remainder of the signal travels through the fused fiber filter 1 and exits at 23 of the second fiber. Thus, the desired wavelength component centered around a given bandwidth is extracted from the frequency-rich signal. It should be understood that the present invention can also be used to insert into a signal a selected wavelength component.

According to BPM simulations, without a photowritten grating 15 in the waist 2 of the fused fiber filter 1, the relative coupling from the large core fiber 9 to the small core fiber 7 can be made to be less than −30 dB.

Figure 2:
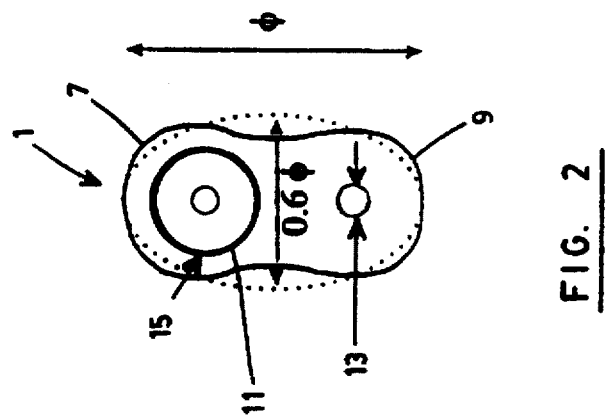
FIG. 2 is a cross-sectional view taken along line II—II of FIG. 1.

According to the simulations, it is much more efficient to have the grating 15 written in one half of the fused fiber filter's waist 2 only, as shown on FIGS. 1 and 2. As such, the small core fiber 7 was assumed to be photosensitive over part of its cladding diameter (85 µm over 125 µm)

The relative dimensions of the fibers 7,9 are preserved in the waist 2 of the fused fiber filter 1. In order to simplify the numerical analysis, the transverse shape of the design of the grating assisted fused-fiber filter 1 and thus the waist, and grating length, L, the waist diameter $\phi$ and the peak index change of the grating $\Delta n$.

Since values of L of 50 mm and $\phi$ of 2 µm are easily obtained, the object of the design was to have the smallest L and largest $\phi$ as possible for a reasonable $\Delta n$, i.e. smaller than $10^{-3}$, and a small bandwidth, i.e. smaller than 2 nm.

Figure 3:
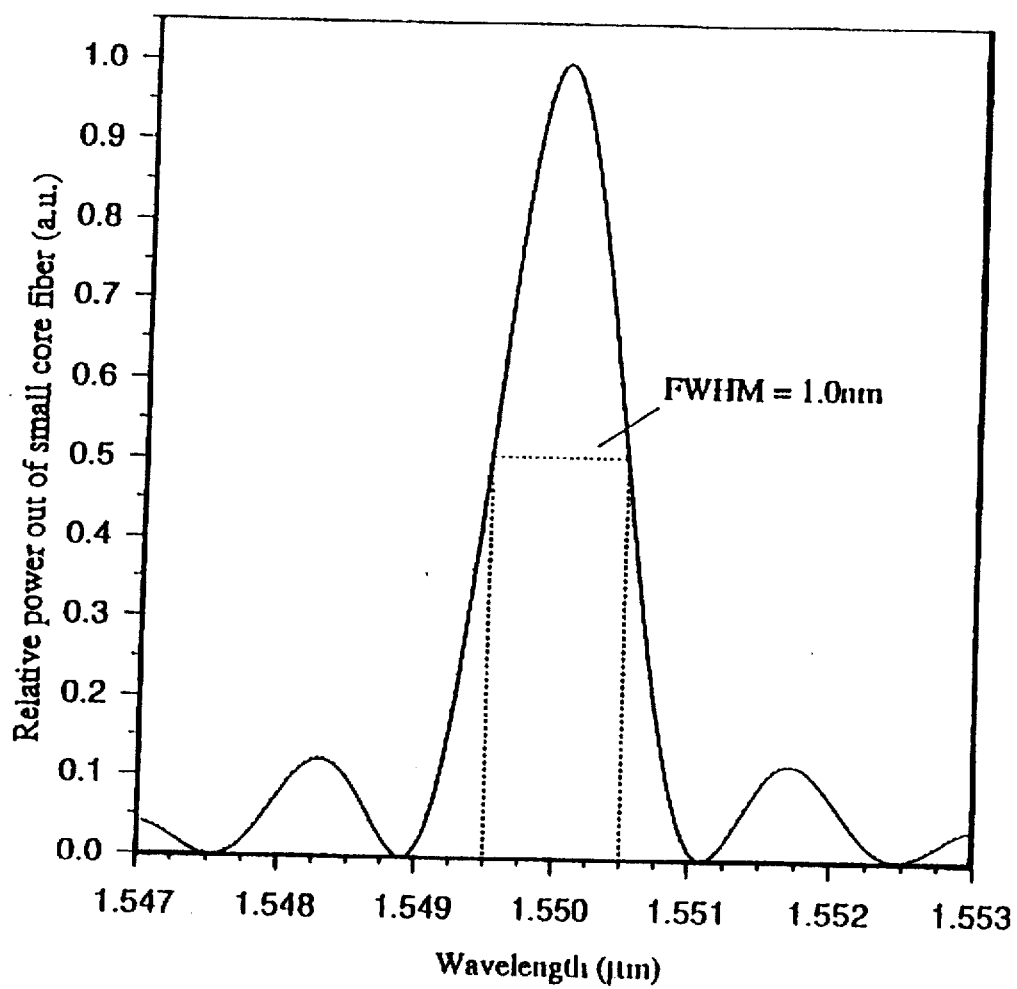
FIG. 3 is a graph of the spectral response of the fused fiber filter of FIG. 1.

As shown on FIG. 3, a filter with L=25 mm and $\phi=2$ µm provides crosstalk of less than −30 dB within a 1.0 nm bandwidth and the frequency response of the grating assisted fused fiber filter 1 is smooth.

Figure 4:
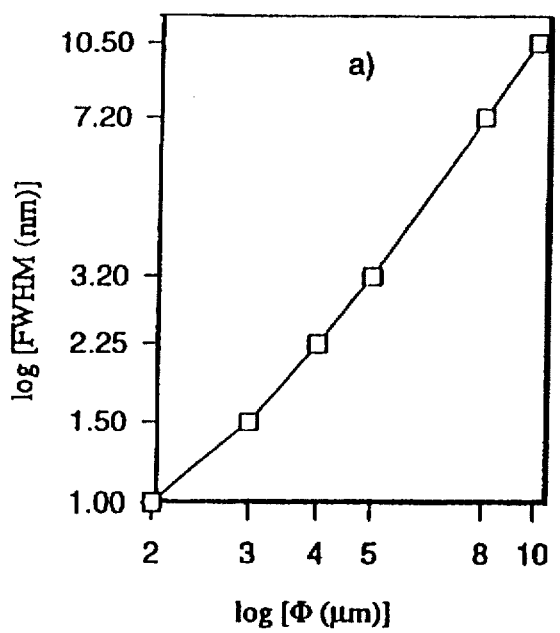
FIG. 4 is a graph of the bandwidth variation as a function of the diameter of the waist.

FIG. 4 is a graph of the bandwidth of the filter 1 as a function of the waist diameter $\phi$. As can be seen, the larger the waist diameter $\phi$, the larger the bandwidth. Thus, in order to have as precise a filter as possible, the waist diameter $\phi$ should be as small as possible.

Figure 5:
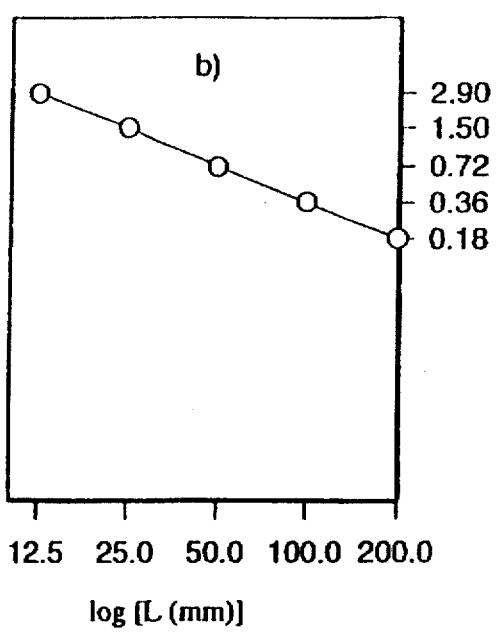
FIG. 5 is a graph of the bandwidth variation as a function of the length of the grating.

FIG. 5 is a graph of the bandwidth of the filter 1 as a function of the length of the grating, with the peak index change $\Delta n$ adjusted. As can be seen, a longer grating has a positive effect on the narrowing of the bandwidth. As such, very narrow filters may be constructed with longer gratings.

Figure 6:
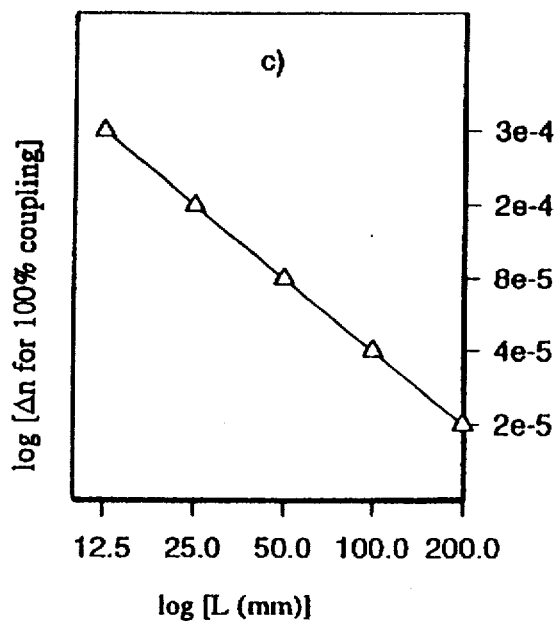
FIG. 6 is a graph of the variation of index change as a function of the length of the grating.

FIG. 6 is a graph of the necessary peak index change $\Delta n$ of the grating for 100% coupling as a function of the length of the grating. As can be seen, the longer the grating, the lower the peak index change must be.

The advantages of using this technique in order to obtain frequency selective coupling is that it works in transmission rather than in reflection, is fairly simple, easy to construct and robust. Furthermore, it is a passive device, and one which does not shift the frequency of the desired component.

It should be understood that the present design would also work is both cladding regions are made to be photosensitive. It is also possible to consider a configuration where a region of the waist is made photosensitive, but not related to the constituent core or cladding.

It is also possible to consider apodization of the photowritten grating shape as it could improve the performance of the grating assisted fused-fiber filter, particularly by reducing the side-lobes of the spectral response. Using a photo-written grating with a variable period could also be considered to have a useful impact of the optical dispersion signal or the filter bandwidth.

Although the present invention has been explained hereinabove by way of a preferred embodiment thereof, it should be pointed out that any modifications to this preferred embodiment within the scope of the appended claims is not deemed to alter or change the nature and scope of the present invention.

What is claimed is:

1. A fused fiber filter for coupling two optical fibers at a given operation wavelength, said fused fiber filter having two opposite ends, a waist, a waist length L, a waist diameter φ, a taper region near each of said opposite ends, a first optical fiber having a first propagation constant $\beta_{fiber1}$ and a first core diameter, and a second optical fiber having a second optical fibers being generally parallel along the waist length of the fused fiber filter, the fused fiber filter being characterized in that:

$\beta_{fiber1}$ is different from $\beta_{fiber2}$;

each of the first and second optical fibers are singlemode at said operation wavelength and at least one of said fibers photosensitive in the region of said waist;

the core diameter of the second optical fiber is larger than the core diameter of the first optical fiber; and at least a portion of said waist is provided with a long period grating, where the period of the grating corresponds to $\Lambda = 2\pi/(\beta_{fiber1} - \beta_{fiber2})$;

whereby said operation wavelength is coupled from one of the first and second optical fiber to the other of the first and second optical fiber.

2. A fused fiber filter according to claim 1, wherein said grating is written in one half of the waist.

3. A fused fiber filter according to claim 2, wherein said grating is written in the half of the waist corresponding to said first optical fiber.

* * * * *